United States Patent
Lee et al.

(10) Patent No.: US 11,889,139 B2
(45) Date of Patent: Jan. 30, 2024

(54) APPARATUS AND METHOD FOR CONTROLLING A DISPLAY

(71) Applicants: HYUNDAI MOTOR COMPANY, Seoul (KR); KIA CORPORATION, Seoul (KR)

(72) Inventors: Tae Ho Lee, Seoul (KR); Mun Jun Hur, Yongin-si (KR); Jong Pil Park, Seoul (KR); Kwang Seung Heo, Seoul (KR); Kyowoong Choo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/486,711

(22) Filed: Sep. 27, 2021

(65) Prior Publication Data
US 2022/0141512 A1    May 5, 2022

(30) Foreign Application Priority Data
Nov. 2, 2020   (KR) .................. 10-2020-0144699

(51) Int. Cl.
| H04N 21/266 | (2011.01) |
| H04N 21/431 | (2011.01) |
| H04N 21/442 | (2011.01) |
| H04N 21/466 | (2011.01) |
| H04N 21/414 | (2011.01) |

(52) U.S. Cl.
CPC ....... *H04N 21/266* (2013.01); *H04N 21/4316* (2013.01); *H04N 21/44222* (2013.01); *H04N 21/466* (2013.01); *H04N 21/41422* (2013.01)

(58) Field of Classification Search
CPC ............ H04N 21/266; H04N 21/4316; H04N 21/44222; H04N 21/466; H04N 21/41422
See application file for complete search history.

(56) References Cited

U.S. PATENT DOCUMENTS

| 2005/0044091 | A1* | 2/2005 | Nakamura ............. G06F 16/58 |
| 2014/0006625 | A1* | 1/2014 | Kojima .................. G06F 9/451 |
| | | | 709/226 |
| 2014/0337770 | A1* | 11/2014 | Sasaki .................. G06F 3/0484 |
| | | | 715/762 |
| 2018/0181268 | A1* | 6/2018 | Huang ................... G06Q 30/06 |
| 2018/0307506 | A1* | 10/2018 | Rudrappa Goniwada .................... |
| | | | G06F 8/38 |
| 2018/0348893 | A1* | 12/2018 | Kim .................... G06F 3/03545 |

FOREIGN PATENT DOCUMENTS

JP            5225004 B2 *   7/2013

* cited by examiner

*Primary Examiner* — Jefferey F Harold
*Assistant Examiner* — Alexander Boyd
(74) *Attorney, Agent, or Firm* — Lempia Summerfield Katz LLC

(57) ABSTRACT

An apparatus for controlling a display includes a controller to set a relationship index indicating relationship between selected content, which is selected through an input of a user, of the at least one content, and remaining content of the at least one content, and arrange an output screen of the output device, based on the relationship index, such that content useful to a user as well as content desired by the user is determined and provided, thereby improving the convenience of the user.

12 Claims, 18 Drawing Sheets

| | MEDIA | MAP | WEATHER | SPORTS | SCHEDULE | AIR CONDITIONING | COMPASS | CLOCK |
|---|---|---|---|---|---|---|---|---|
| MEDIA | | 5 | 8 | 7 | 3 | 5 | 2 | 3 |
| MAP | 5 | | 8 | 5 | 9 | 3 | 7 | 6 |
| WEATHER | 8 | 8 | | 8 | 6 | 8 | 2 | 3 |
| SPORTS | 7 | 8 | 8 | | 9 | 3 | 2 | 2 |
| SCHEDULE | 3 | 9 | 6 | 9 | | 2 | 3 | 9 |
| AIR CONDITIONING | 5 | 3 | 8 | 3 | 2 | | 1 | 1 |
| COMPASS | 2 | 7 | 2 | 2 | 3 | 1 | | 1 |
| CLOCK | 3 | 6 | 3 | 2 | 9 | 1 | 1 | |

|  | MAP | WEATHER | SPORTS | SCHEDULE | AIR CONDITIONING | COMPASS | CLOCK |
|---|---|---|---|---|---|---|---|
| MEDIA | DEFAULT RELATIONSHIP INDEX → 5 | RELATIONSHIP INDEX → 8, CORRELATION IS INCREASED BECAUSE CATEGORY OF DESIRED MEDIA IS VARIED DEPENDING ON WEATHER. | RELATIONSHIP INDEX → 7, IF SPORTS TEAM SUPPORTED BY USER OUTPERFORMS, EXCITING MUSIC OR TEAM CHEERING SONG MAY BE DESIRED. | RELATIONSHIP INDEX → 3, BECAUSE USER WANTS TO CONCENTRATE THOUGHTS ON SCHEDULE, WITHOUT ANY NOISE. | DEFAULT RELATIONSHIP INDEX → 5 | RELATIONSHIP INDEX → 2, NO CORRELATION. | RELATIONSHIP INDEX → 3, NO CORRELATION. |
| MAP |  | RELATIONSHIP INDEX → 8, BECAUSE ARRIVAL TIME IS INFLUENCED BY WEATHER AND PATH. | DEFAULT RELATIONSHIP INDEX → 5, BECAUSE RELATIONSHIP INDEX IS ADJUSTED UP IN ARRIVING AROUND SUPPORTED TEAM. | DEFAULT VALUE 5 (RELATIONSHIP INDEX IS ADJUSTED UP IN ARRIVING AROUND SUPPORTED TEAM) | RELATIONSHIP INDEX → 3, NO CORRELATION. | RELATIONSHIP INDEX → 7, COMPLEMENTARY RELATIONSHIP, BECAUSE I WANT TO OFTEN KNOW AZIMUTH ORIENTATION DEPENDING ON THE DIRECTION THAT I MOVE. | RELATIONSHIP INDEX → 6, BASED ON CORRELATION BETWEEN CURRENT TIME AND ARRIVAL TIME IN DRIVING. |
| WEATHER |  |  | RELATIONSHIP INDEX → 8, BECAUSE GAME IS PLAYED/CANCELED OR GAME CONDITION IS VARIED DEPENDING ON WEATHER. → 8 (A) | RELATIONSHIP INDEX → 6, BECAUSE SCHEDULE (TRIP, BUSINESS, OR BUSINESS TRIP) IS VARIED DEPENDING ON WEATHER. | RELATIONSHIP INDEX → 9, BECAUSE AIR CONDITIONING INSIDE VEHICLE IS VARIED DEPENDING ON WEATHER. | RELATIONSHIP INDEX → 2, NO CORRELATION. | RELATIONSHIP INDEX → 3, NO CORRELATION. |
| SPORTS |  |  |  | RELATIONSHIP INDEX → 9, (B) BECAUSE VIEWING OF SPORTS GAME IS POSSIBLE/DISABLED, DEPENDING ON SCHEDULE. | RELATIONSHIP INDEX → 3, NO CORRELATION. | RELATIONSHIP INDEX → 2, NO CORRELATION. | RELATIONSHIP INDEX → 2, NO CORRELATION. |
| SCHEDULE |  |  |  |  | RELATIONSHIP INDEX → 2, NO CORRELATION. | RELATIONSHIP INDEX → 3, NO CORRELATION. | RELATIONSHIP INDEX → 9, BECAUSE SCHEDULE IS BASICALLY CHECKED/MANAGED DEPENDING ON TIME. |
| AIR CONDITIONING |  |  |  |  |  | RELATIONSHIP INDEX → 1, NO CORRELATION. | RELATIONSHIP INDEX → 1, NO CORRELATION. |
| COMPASS |  |  |  |  |  |  | RELATIONSHIP INDEX → 1, NO CORRELATION. |
| CLOCK |  |  |  |  |  |  |  |

FIG.2

|  | MEDIA | MAP | WEATHER | SPORTS | SCHEDULE | AIR CONDITIONING | COMPASS | CLOCK |
|---|---|---|---|---|---|---|---|---|
| MEDIA |  | 5 | 8 | 7 | 3 | 5 | 2 | 3 |
| MAP | 5 |  | 8 | 5 C | 9 | 3 | 7 | 6 |
| WEATHER | 8 | 8 |  | 8 | 6 | 8 | 2 | 3 |
| SPORTS | 7 | D 8 | 8 |  | 9 | 3 | 2 | 2 |
| SCHEDULE | 3 | 9 | 6 | 9 |  | 2 | 3 | 9 |
| AIR CONDITIONING | 5 | 3 | 8 | 3 | 2 |  | 1 | 1 |
| COMPASS | 2 | 7 | 2 | 2 | 3 | 1 |  | 1 |
| CLOCK | 3 | 6 | 3 | 2 | 9 | 1 | 1 |  |

FIG.3

| MAIN SCREEN : AIR CONDITIONING | SUB-SCREEN 1 : WEATHER |

FIG.4A

| MAIN SCREEN : SPORTS | SUB-SCREEN 1 : WEATHER | SUB-SCREEN 2 : SCHEDULE |

FIG.4B

| MAIN SCREEN : AIR CONDITIONING | SUB-SCREEN 1 : WEATHER | SUB-SCREEN 2 : SCHEDULE | SUB-SCREEN 3 : MAP |
|---|---|---|---|

FIG. 4C

| | MEDIA | MAP | WEATHER | SPORTS | SCHEDULE | AIR CONDITIONING | COMPASS | CLOCK |
|---|---|---|---|---|---|---|---|---|
| MEDIA | | 5 | 8 (MUSIC RECOMMENDED BASED ON WEATHER) | 7 (EXCITED STATE OF USER IS VARIED DEPENDING ON SPORTS RESULT) | 3 | 5 (MUSIC IS ABLE TO BE SELECTED DEPENDING ON TEMPERATURE) | 2 | 3 |
| MAP | 5 | | (8)-E | 8/5 ('8' IN STADIUM OUTSKIRTS, '5': NON-STADIUM OUTSKIRTS) | (9)-F (DISTANCE TO SPECIFIC PLACE) | 3 | 7 | 6 |
| WEATHER | 8 | (8)-G | | 8 (GAME CONDITION IS VARIED DEPENDING ON WEATHER) | 6 | 8 | 2 | 3 |
| SPORTS | 7 | 8 | | | 9 | 3 | 2 | 2 |
| SCHEDULE | 3 | (9→DECREASED)-H | 6 | 9 | | 2 | 3 | 9 |
| AIR CONDITIONING | 5 | (7→8 INCREASED)-I | 8 | 3 | 2 | | 1 | 1 |
| COMPASS | 2 | 3 | 2 | 2 | 3 | 1 | | 1 |
| CLOCK | 3 | 6 | 3 | 2 | 9 | 1 | 1 | |

FIG.5

| MAIN SCREEN : MAP | SUB-SCREEN 1 : WEATHER | SUB-SCREEN 2 : SCHEDULE |

FIG.6A

| MAIN SCREEN : MAP | SUB-SCREEN 1 : WEATHER | SUB-SCREEN 2 : SCHEDULE |

FIG.7A

| MAIN SCREEN : MAP | SUB-SCREEN 1 : WEATHER | SUB-SCREEN 2 : SCHEDULE | SUB-SCREEN 3 : COMPASS |
|---|---|---|---|

FIG. 7B

| MAIN SCREEN : MAP | SUB-SCREEN 1 : WEATHER |

FIG.8A

| MAIN SCREEN : WEATHER | SUB-SCREEN 1 : WEATHER |

FIG.8B

FULL SCREEN: WEATHER

FIG.8C

| MAIN SCREEN : WEATHER | SUB-SCREEN 1 : SPORTS | SUB-SCREEN 2 : AIR CONDITIONING |
|---|---|---|

FIG.8D

APPARATUS AND METHOD FOR CONTROLLING A DISPLAY

CROSS-REFERENCE TO RELATED APPLICATION

This application claims the benefit of priority to Korean Patent Application No. 10-2020-0144699, filed in the Korean Intellectual Property Office on Nov. 2, 2020, the entire contents of which are incorporated herein by reference.

TECHNICAL FIELD

The present disclosure relates to an apparatus and a method for controlling a display.

BACKGROUND

Studies and research have been carried out regarding how a display provides information and how to most effectively provide information to a user. In general, a display may provide information selected through a user input. Since the general display provides only limited information to the user, there is needed to develop a technology capable providing various types of information.

SUMMARY

The present disclosure has been made to solve the above-mentioned problems occurring in the prior art while maintaining advantages achieved by the prior art.

An aspect of the present disclosure provides an apparatus and a method for controlling a display capable of determining and providing content useful to a user, as well as providing content corresponding to the input of the user.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for controlling a display may include a controller and an output device to output at least one content. The controller sets a relationship index indicating the relationship between selected content, which is selected through an input of a user of the at least one content, and remaining content of the at least one content, and arranges an output screen of the output device, based on the relationship index.

The controller may output the selected content, which is selected through the input of the user, to a main screen which is set in an entire portion of the output screen.

The controller may dispose at least one sub-screen at one side of the main screen by splitting a specific region of the main screen when content having a relationship index of a specific value or more is present and output the content having the relationship index of the specific value or more to the sub-screen.

The controller may adjust down the relationship index when the content output to the sub-screen is output-cancelled by the input of the user.

The controller may prevent content, which has a relationship index changed to be less than the specific value, from being output to the sub-screen when the relationship index is consecutively adjusted down to be less than the specific value.

The controller may adjust up a relationship index of content when the content is added by the input of the user.

The controller may dispose an additional sub-screen by further splitting a specific region of the main screen, when the relationship index is consecutively adjusted up such that the relationship index is the specific value or more, and output content having the relationship index changed to the specific value or more to the additionally-disposed sub-screen.

The controller may cancel disposing the sub-screen when the main screen and the sub-screen output the same content.

The controller may output the content having the relationship index of the specific value or more to the sub-screen, when the main screen and the sub-screen output the same content.

The controller may learn positions in which the main screen and the sub-screen are disposed.

According to another aspect of the present disclosure, a method for controlling a display may include setting a relationship index indicating a relationship between selected content, which is selected through an input of a user of at least one content, and remaining content of the at least one content, and arranging an output screen of the output device, based on the relationship index.

The method may further include outputting the selected content corresponding to the input of the user, to a main screen which is set in an entire portion of the output screen.

At least one sub-screen may be disposed at one side of the main screen by splitting a specific region of the main screen, when content having a relationship index of a specific value or more is present, and the content having the relationship index of the specific value or more may be output to the sub-screen.

The method may further include adjusting down the relationship index when the content output to the sub-screen is output-cancelled by the input of the user.

Content, which has a relationship index changed to be less than the specific value, may be prevented from being output to the sub-screen, when the relationship index is consecutively adjusted down to be less than the specific value.

The method may further include adjusting up a relationship index of content when the content is added by the input of the user.

A sub-screen may be additionally disposed by further splitting a specific region of the main screen, when the relationship index is consecutively adjusted up such that the relationship index is the specific value or more, and content having the relationship index changed to the specific value or more may be disposed to the additional sub-screen.

Disposing the sub-screen may be canceled when the main screen and the sub-screen output the same content.

The content having the relationship index of the specific value or more may be output to the sub-screen, when the main screen and the sub-screen output the same content.

The method may further include learning positions in which the main screen and the sub-screen are disposed.

BRIEF DESCRIPTION OF THE DRAWINGS

The above and other objects, features, and advantages of the present disclosure should be more apparent from the following detailed description taken in conjunction with the accompanying drawings:

FIG. 2 is a view schematically illustrating a manner of setting a content relationship index, according to an embodiment of the present disclosure;

FIG. 3 is a view illustrating a relationship index of content set according to an embodiment of the present disclosure;

FIG. 4A, FIG. 4B, and FIG. 4C are views illustrating manners of arranging screens, according to embodiments of the present disclosure;

FIG. 5 is a view illustrating a relationship index changed, according to an embodiment of the present disclosure;

FIG. 6A, FIG. 6B, FIG. 7A, and FIG. 7B are views illustrating a manner of disposing screens, based on a relationship index changed, according to another embodiment of the present disclosure;

FIG. 8A, FIG. 8B, FIG. 8C, and FIG. 8D are views illustrating a manner of disposing a screen, according to another embodiment of the present disclosure;

DETAILED DESCRIPTION

Figure 1:
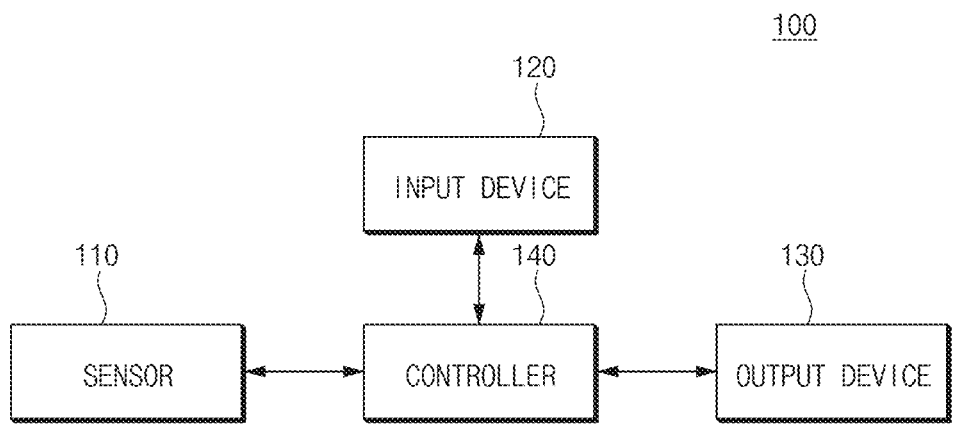
FIG. 1 is a view illustrating a configuration of an apparatus for controlling a display, according to an embodiment of the present disclosure.

Hereinafter, some embodiments of the present disclosure are described in detail with reference to the drawings. In adding the reference numerals to the components of each drawing it should be noted that the identical or equivalent component is designated by the identical numeral even when they are displayed on other drawings. Further, in describing the embodiments of the present disclosure, a detailed description of well-known features or functions has been omitted in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence, or order of the constituent components. In addition, unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art. Such terms are not to be interpreted as having ideal or excessively formal meanings unless clearly defined as having such in the present application.

FIG. 1 is a view illustrating a configuration of an apparatus for controlling a display, according to an embodiment of the present disclosure.

As illustrated in FIG. 1, according to an embodiment of the present disclosure, an apparatus 100 for controlling a display may include a sensor 110, an input device 120, an output device 130, and a controller 140.

The sensor 110 may acquire surrounding information and location change information. According to an embodiment of the present disclosure, the sensor 110 may include a temperature sensor, an illuminance sensor, and a rain sensor, and the controller 140 may determine information on an external environment (e.g., weather) based on information obtained by the sensor 110. According to an embodiment of the present disclosure, the sensor 110 may include a location sensor, for example, a GPS receiving device, and may receive a current location. The controller 140 may provide information on a map image of a specific region, based on information on the current location, information on a direction guide to a destination when the user inputs the destination, and information on the destination.

The input device 120 may receive, depending on a manipulation, an operation, or a voice of the user, relevant input signals, and may receive user information, according to an embodiment. In this case, the user information may include a personal schedule or personal information (taste information) of the user. The controller 140 may activate content corresponding to an input signal. According to an embodiment of the present disclosure, the input device 120 may be implemented with a scroll wheel, a button, a knob, a touch screen, a touch pad, a lever, or a track ball, or may be implemented with at least one of a motion sensor and a voice recognizing sensor to sense the motion of the user or the voice of the user, or the combination thereof.

The output device 130 may visually output content and be activated in response to an input signal and at least one content determined by the controller 140. According to an embodiment, the output device 130 may be implemented with a display, and for example, may include a head up display (HUD) or a cluster provided in a vehicle. However, the present disclosure is not limited thereto, and may include a TV and a video advertisement board constituting a screen. The content may include information which may be output through the output device 130 and may be provided to the user. According to an embodiment, the content may include media, a map, weather, sports, a schedule, an air conditioning, a compass, or a clock.

The controller 140 may be implemented with various processing devices, such as a microprocessor embedded therein with a semiconductor chip to operate or execute various instructions. The controller 140 may control the overall operation of the apparatus for controlling the display, according to an embodiment of the present disclosure. In detail, the controller 140 may set a relationship index indicating the relationship between content, i.e., a selected content, which is selected through the input of the user of at least one content, and remaining content of the at least one content, and may arrange output screens of the output device 130, based on the relationship index.

According to an embodiment, the controller 140 may output selected content selected by the user to a main screen which, is set in the entire portion of the output device 130. In addition, the controller 140 may split a specific region of the main screen into at least one region, and may generate at least one split region as a sub-screen such that the sub-screen is disposed at one side of the main screen, when there is present at least one content having the relationship index, which indicates the relationship with the content selected by the user and is equal to or greater than a specific value. In addition, the controller 140 may output at least one content, which has the relationship index of a specific value or more, to the sub-screen. Hereinafter, the relationship index is described in more detail with reference to FIG. 2.

FIG. 2 is a view schematically illustrating a manner of setting a content relationship index, according to an embodiment of the present disclosure. According to an embodiment of the present disclosure, the manner of setting the relationship index in FIG. 2 is performed based on a current time point. In other words, the controller 140 may set a relationship index for at least one content set forth in a first row of the right side, when any one content set forth in a first column of the left side is content selected by the user at the current time point.

According to an embodiment, the controller 140 may set the relationship index between media content and map content as a default value (e.g., 5), when the media content (e.g., music) is output to the main screen by the selection of the user. In addition, the controller 140 may determine that a category of media desired by the user is varied depending on weather and may set the relationship index between the media content and the weather content to be '8'. In addition, the controller 140 may determine that the user may want to listen to exciting music or a team fight song or alma mater. The controller 140 may thus set the relationship index between the media content and the sports content to be '7', when a sports team supported by the user has a good performance. In addition, the controller 140 may set the relationship index between the media content and schedule content to be '3' when determining that the user wants to concentrate on something, based on the future schedule. In addition, the controller 140 may set the relationship index between the media content and the air conditioning content to be a default value. The controller 140 may determine that the compass content has no relationship with the clock content and may set the relationship index between the media content and the compass content to be '2' or '3'.

When the user selects map content, weather content, sports content, schedule content, air conditioning content, compass content, or clock content provided in the first column of the left side, the controller 140 may set the relationship index for at least one content (provided in the first row of the right side) indicating the relationship with the selected content in the manner as described above. The above-described relationship index is provided for the illustrative purpose according to the embodiment, and may be varied depending on surrounding information, user information, or position change information.

The controller 140 may additionally set the relationship index in the manner of setting the relationship index as in illustrated in FIG. 2, when the surrounding information, the user information, or the position change information is changed, as a specific time is elapsed. Additionally, setting the relationship index is described with reference to FIG. 3.

FIG. 3 is a view illustrating a relationship index of content set according to an embodiment of the present disclosure.

As illustrated in FIG. 3, the controller 140 may set the relationship index for at least one content set forth in the first row of the right side, when any one content in the first column of the right side is selected by the user, after setting the relationship index in the manner as illustrated in FIG. 2.

According to an embodiment, the controller 140 may set the relationship index between the map content and the media content to be a default value (e.g., 5), when the map content is disposed on the main screen by the selection of the user. In addition, the controller 140 may set the relationship index between the map content and the weather content to be '8' since an arrival time based on path setting is influenced by weather. In addition, the controller 140 may re-set the relationship index between the map content and the sports content to be '8', when determining that the user is close to a stadium where the game of the team that the user wants to watch is being played. In addition, the controller 140 may set the relationship index between the map content and the schedule content to be '9', when a schedule is to watch the game, and when it is determined that the user is close to the stadium wherein the game is being played. The controller 140 may set the relationship index between the map content and the air conditioning content to be '3', since there is no relationship with the air conditioning content. The controller 140 may set the relationship index between the map content and the compass content to be '7' since a progressing direction has a relationship with a direction of east, west, south, or north. In addition, the controller 140 may set the relationship index between the map content and the clock content to be '6' since there is the relationship with the arrival time at the destination.

When the user selects map content, weather content, sports content, schedule content, air conditioning content, compass content, or clock content provided in the first column of the right side, the controller 140 may set the relationship index for at least one content (provided in the first row of the left side) indicating the relationship with the selected content in the manner as described above. The above-described relationship index is provided for the illustrative purpose according to the embodiment, and may be varied depending on surrounding information, user information, or position change information.

The controller 140 may output content having a relationship index of a specific value or more to the sub-screen disposed as a specific region of the split main screen. The details thereof are described below with reference to FIGS. 4A-4C.

FIG. 4A, FIG. 4B, and FIG. 4C are views illustrating manners of arranging screens, according to an embodiment of the present disclosure.

The controller 140 may output air conditioning content to a main screen set in the output screen (not shown but similar to FIG. 8C), when the air conditioning content is determined as being selected by the user. As shown in FIG. 4A, the controller 140 may dispose a sub-screen at one side of the main screen, and may output content, such as weather content (see 'A' of FIG. 2) to the sub-screen having the relationship index of the specific value or more.

The controller 140 may output, to the sub-screen, content having the relationship index of the specific value or more with the sports content, when the content selected by the user is changed from the air conditioning content to the sports content. To this end, according to an embodiment, as illustrated in FIG. 4B, the controller 140 may output the sports content to the main screen set in the entire portion of the output screen. In addition, the controller 140 may dispose sub-screens, which are generated as the specific region of the main screen is split, at one side of the main screen, and may output content (that is, weather content (see 'A' of FIG. 2) and schedule content (see 'B' of FIG. 2)) having the relationship index of the specific value (e.g., '8') or more to the sub-screens disposed at one side of the main screen.

Meanwhile, when the surrounding information, the user information, or the position change information is changed as the specific time is elapsed, for example, when it is determined that the user becomes closer to a stadium where the game of the team that the user wants to watch is being played, the controller 140 sets the relationship index between the map content and the sports content by changing the relationship index from the relationship index of '5' (see 'C' of FIG. 3), which is set at the initial stage, to the relationship index of '8' (see 'D' of FIG. 3). Accordingly, as illustrated in FIG. 4C, the controller 140 may add map content, which is set to the specific value or more in the relationship index with the sports content, at the time point that the specific time is elapsed. To this end, the controller 140 may further split the specific region of the main screen to additionally generate the sub-screen and may dispose the additionally generated sub-screen at one side of the sub-screen which is previously generated. In addition, the controller 140 may output the map content to the additionally disposed sub-screen.

The controller 140 may change the relationship index depending on the input of the user, in addition to changing and setting the relationship index after a specific time has elapsed. The details thereof are described below with reference to FIG. 5.

FIG. 5 is a view illustrating the relationship index having changed, according to an embodiment of the present disclosure.

As illustrated in FIG. 5, the controller 140 may output content, which is selected by the user, to the main screen and may output, to the sub-screen, content, which has the relationship index of the specific value or more with the content selected by the user. The controller 140 may adjust down the preset relationship index, when the user inputs cancelling the output of the sub-screen disposed as described above.

For example, the controller 140 may output, to the main screen, the map content, when the user selects the map content. In addition, the controller 140 may output, to the sub-screen, content having relationship with the map content and having the relationship index of the specific value or more in the relationship index with the map content. According to an embodiment, the controller 140 may output, to the sub-screen, the weather content (see 'E' of FIG. 5: relationship index of '8'), and schedule content (see 'F' of FIG. 5: relationship index of '9').

The controller 140 may adjust down the relationship index of specific content (relationship index of '9'→relationship index of '8'), when cancelling output is input with respect to some of content which is output to the sub-screen. Accordingly, the controller 140 may set the relationship index between the map content and the specific content to '8' in ignition 'ON' after ignition 'OFF'.

For example, the controller 140 may output, to the main screen, the map content, when the user selects the map content after ignition 'ON'. In addition, the controller 140 may output, to the sub-screen, content having relationship with the map content and having the relationship index of the specific value or more with the map content. According to an embodiment, the controller 140 may output, to the sub-screen, the weather content (see 'G' of FIG. 5: relationship index of '8'), and schedule content (see 'H' of FIG. 5: relationship index of '8').

The controller 140 may adjust down the relationship index of specific content (relationship index of '8'→relationship index of '7'), when cancelling outputting is input with respect to some of content which is output to the sub-screen. Accordingly, the controller 140 may set the relationship index between the map content and the specific content to '7' in ignition 'ON' after ignition 'OFF'. In this case, the controller 140 may prevent content having the relationship index of less than the specific value from being output to the sub-screen. The details thereof are described below with reference to FIG. 6A and FIG. 6B.

To the contrary, the controller 140 may output content, which is selected by the user, to the main screen, and may output content, which has the relationship index of the specific value or more, to the sub-screen. In this case, when it is determined that the content having the relationship index of less than the specific value is output to the sub-screen additionally disposed by the input of the user, the controller 140 may adjust up the relationship index of the content which is output to the sub-screen additionally disposed (see 'I' of FIG. 5: change relationship index of '7'→relationship index of '8'). In this case, the controller 140 may prevent content having the relationship index of the specific value or more from being output to the sub-screen. The details thereof are described below with reference to FIG. 7A, and FIG. 7B.

FIG. 6A, FIG. 6B, FIG. 7A, and FIG. 7B are views illustrating a manner for disposing screens, based on the relationship index changed, according to an embodiment of the present disclosure.

Figure 6B:
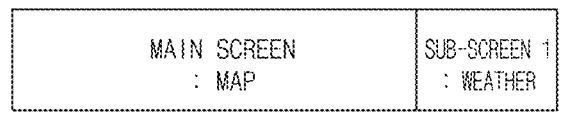

As illustrated in FIG. 6A and FIG. 6B, the controller 140 outputs map content to the main screen, and outputs content (weather content and schedule content) having the relationship index of the specific value or more to the sub-screen, as the user selects the map content. In this case, when the user consecutively inputs cancelling the output of some content, the controller 140 may adjust down the relationship index of some content. When the relationship index is consecutively adjusted down, such that the relationship index of the some content becomes less than the specific value, the controller 140 may prevent the some content from being output to the sub-screen, even if the user selects the map content.

As illustrated in FIG. 7A and FIG. 7B, the controller 140 outputs map content to the main screen, and outputs content (weather content and schedule content) having the relationship index of the specific value or more to the sub-screen, as the user selects the map content. In this case, when the user consecutively inputs cancelling the output of compass content, the controller 140 may adjust up the relationship index of the compass content. When the relationship index is consecutively adjusted up such that the relationship index of the compass content becomes equal to or greater than the specific value, the controller 140 may further split the specific region of the main screen, may additionally dispose a sub-screen, and may output the compass content to the additionally-disposed sub-screen. Accordingly, the controller 140 may output, to the sub-screen, the weather content, the schedule content, and the compass content together, when the user selects the map content.

The controller 140 may cancel disposing the sub-screen, and fully output the main screen, or may change the content on the sub-screen to another content to be displayed to the sub-screen, when the same content is output to the main screen and the sub-screen. The details thereof are described below with reference to FIG. 8A, FIG. 8B, FIG. 8C, and FIG. 8D.

FIG. 8A, FIG. 8B, FIG. 8C, and FIG. 8D are views illustrating a manner of disposing a screen, according to another embodiment of the present disclosure.

Figure 8A:
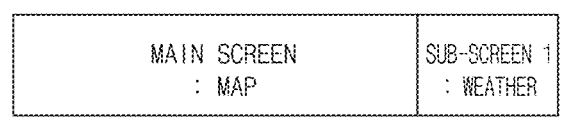
Figure 8B:
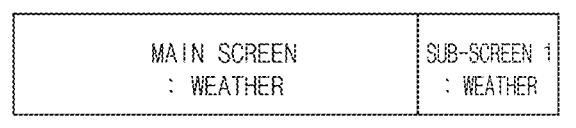
Figure 8C:
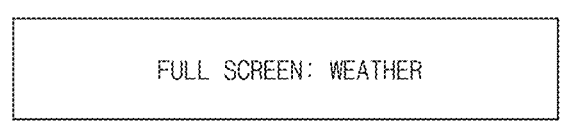

As illustrated in FIG. 8A, FIG. 8B, FIG. 8C, and FIG. 8D, as the user selects the map content, the controller 140 may output, to the main screen, the map content, and may output content (weather content) having relationship with the map content to a sub-screen split from the main screen and disposed at one side of the main screen (see FIG. 8A). When the user selects the weather content in the state of FIG. 8A, the controller 140 may output the weather content to the main screen (see FIG. 8B). When it is determined that the weather content is output to the main content and the sub-content, the controller 140 may cancel disposing the sub-screen and may fully output the main screen (see FIG. 8C). Alternatively, the controller 140 may change the content output to the sub-screen to content (e.g., sports content and air conditioning content) having relationship with the weather content which is output to the main screen and may output the changed content (see FIG. 8D).

In addition, the controller 140 may adjust positions, at which the main screen and the sub-screen are disposed, on the output screen, depending on the input of the user, and may learn the positions at which the main screen and the sub-screen are disposed.

Figure 9:
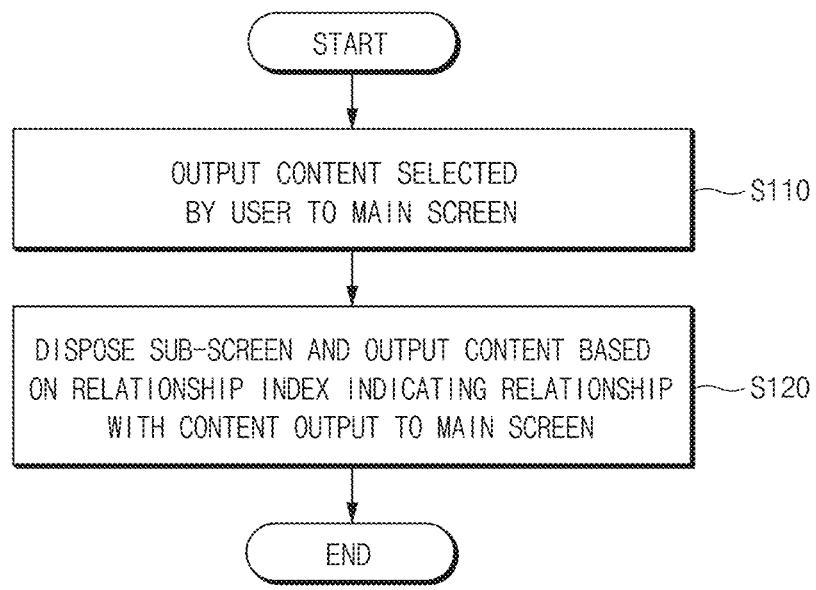
FIG. 9 is a flowchart illustrating a method for controlling a display, according to an embodiment of the present disclosure.

FIG. 9 is a flowchart illustrating a method controlling a display, according to an embodiment of the present disclosure.

As illustrated in FIG. 9, the controller 140 may output content, which is selected by the user, to the main screen (S110). In S110, the controller 140 may output content, which is selected by the input of the user, to the main screen set in the entire portion of the output screen.

The controller 140 may output content, which is set to have the relationship index of a specific value or more, to a sub-screen, which is disposed as the specific region of the main screen is split, based on the relationship index indicating the relationship with the content output to the main screen (S120). According to an embodiment, in S120, the controller 140 may split a specific region of the main screen into at least one region, and may generate at least one split region as a sub-screen such that the sub-screen is disposed at one side of the main screen, when there is present at least one content having the relationship index, which indicates the relationship with the content selected by the user and is equal to or greater than a specific value. In addition, the controller 140 may output at least one content, which has the relationship index of the specific value or more to the sub-screen. In this case, the more detailed manner of setting the relationship index may be understood by referring to the description with reference to FIGS. 2, 3, and 5. The detailed manner of disposing the sub-screen and the output of the content may be understood by referring to the description with reference to FIGS. 4 and 6.

Figure 10:
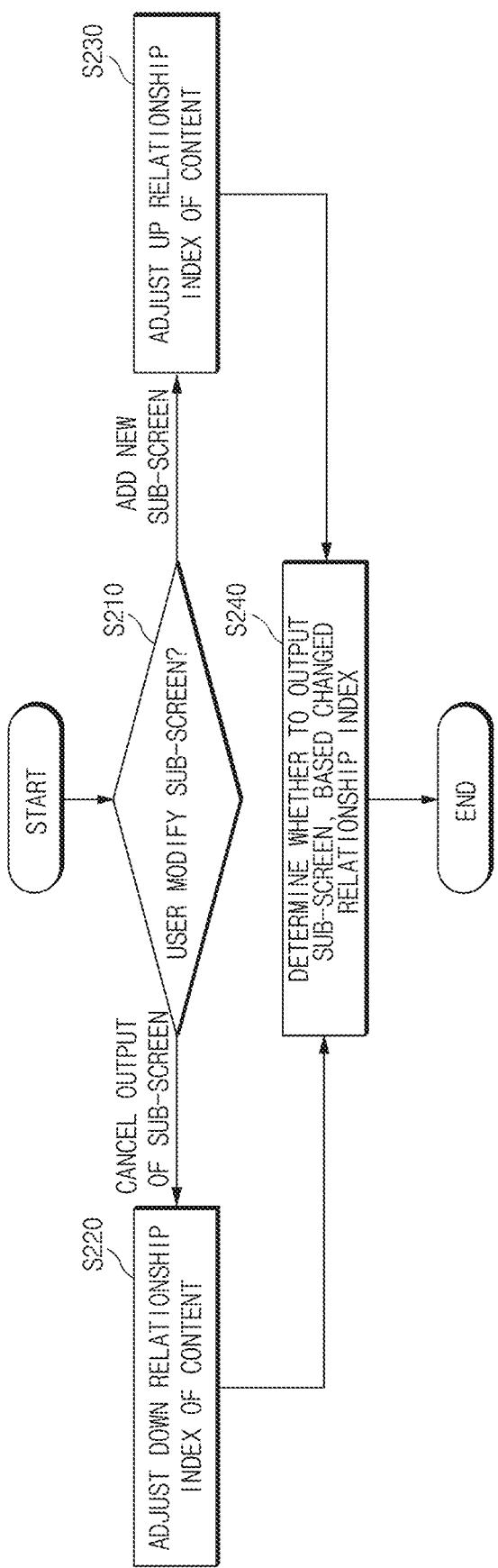
FIG. 10 is a flowchart illustrating a method for controlling a display, according to an embodiment of the present disclosure.

FIG. 10 is a flowchart illustrating a method for controlling a display, according to an embodiment of the present disclosure.

As illustrated in FIG. 10, the control device 140 may output content, which is selected by the user, to the main screen, and may output, to the sub-screen, content having the relationship index of the specific value or more with the content selected by the user. In addition, the controller 140 may determine whether the user modifies the sub-screen (S210).

In S210, the controller 140 may adjust down the preset relationship index, when the user inputs cancelling the output of the sub-screen (S220). Meanwhile, the controller 140 may adjust up the relationship index of content, which is output to the additionally-disposed sub-screen, when it is determined that content, which has the relationship index of less than the specific value, is output to the additionally-disposed sub-screen by the input of the user (S230).

The controller 140 may determine the output state of the sub-screen, based on the changed relationship index (S240). When the relationship index is set to less than the specific value, as the relationship index is consecutively adjusted down by the input of the user in S220, the controller 140 may prevent the content having the relationship index of less than the specific value from being output to the sub-screen in S240. The details thereof may be understood by referring to the description with reference to FIG. 6A and FIG. 6B. In addition, when the relationship index is set to the specific value or more, as the relationship index is consecutively adjusted up by the input of the user in S230, the controller 140 may output the content, which is selected by the user, to the sub-screen, which is disposed by splitting the specific region of the main screen to output the content selected. The details thereof may be understood by referring to the description with reference to FIG. 7A and FIG. 7B.

Figure 11:
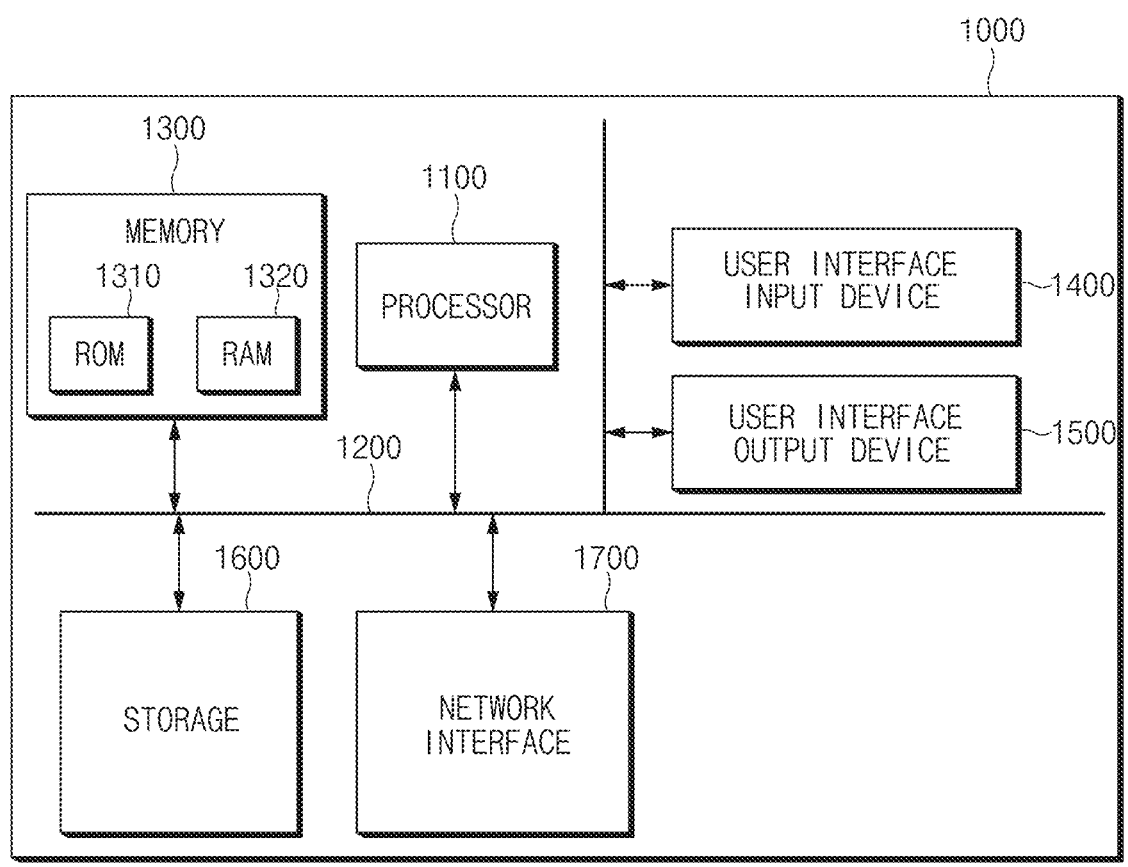
FIG. 11 is a block diagram illustrating a computing system to execute the method according to an embodiment of the present disclosure.

FIG. 11 is a block diagram illustrating a computing system to execute the method according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the apparatus and the method for controlling the display, since the content useful to the user may be determined and provided, as well as that content input by the user is provided the convenience of the user may thereby be improved.

Hereinabove, although the present disclosure has been described with reference to several embodiments and the accompanying drawings, the present disclosure is not limited thereto. The embodiments may be variously modified and altered by those having ordinary skill in the art to which the present disclosure pertains without departing from the spirit and scope of the present disclosure claimed in the following claims.

Therefore, embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a display, the apparatus comprising:
    an output device configured to output at least one content; and
    a controller configured to set a relationship index indicating a relationship between selected content, which is selected through an input of a user of the at least one content, and remaining content, which is not selected through the input of the user of the at least one content, and arrange an output screen of the output device, based on the relationship index, wherein the relationship index is set to increase as a degree that the selected content is related to the remaining content is increased, wherein the controller is configured to output the selected content, which is selected through the input of the user, to a main screen, which is set in an entire portion of the output screen, wherein the controller is configured to dispose at least one sub-screen at one side of the main screen by splitting a specific region of the main screen, when content having a relationship index of a specific value or more is present, and to output the content having the relationship index of the specific value or more, to the at least one sub-screen, wherein the controller is configured to adjust down the relationship index, when the content output to the at least one sub-screen is output-cancelled by the input of the user, and wherein the controller is configured to prevent content, which has a relationship index changed to be less than the specific value, from being output to the at least one sub-screen, when the relationship index is consecutively adjusted down to be less than the specific value.

2. The apparatus of claim 1, wherein the controller is configured to adjust up a relationship index of content when the content is added by the input of the user.

3. The apparatus of claim 2, wherein the controller is configured to:
additionally dispose a sub-screen by further splitting a specific region of the main screen, when the relationship index is consecutively adjusted up such that the relationship index is the specific value or more; and
output content having the relationship index changed to the specific value or more to the additionally disposed sub-screen.

4. The apparatus of claim 1, wherein the controller is configured to cancel disposing the at least one sub-screen when the main screen and the at least one sub-screen output the same content.

5. The apparatus of claim 1, wherein the controller is configured to output the content having the relationship index of the specific value or more to the at least one sub-screen when the main screen and the at least one sub-screen output the same content.

6. The apparatus of claim 1, wherein the controller is configured to learn positions in which the main screen and the at least one sub-screen are disposed.

7. A method for controlling a display, the method comprising:

setting a relationship index indicating a relationship between selected content, which is selected through an input of a user of at least one content, and remaining content, which is not selected through the input of the user of the at least one content;

arranging an output screen of an output device, based on the relationship index;

outputting the selected content, which is selected through the input of the user, to a main screen, which is set in an entire portion of the output screen;

setting the relationship index to increase as a degree that the selected content is related to the remaining content is increased;

disposing at least one sub-screen at one side of the main screen by splitting a specific region of the main screen, when content having a relationship index of a specific value or more is present;

outputting the content having the relationship index of the specific value or more to the at least one sub-screen; and adjusting down the relationship index, when the content output to the sub-screen is output-cancelled by the input of the user, wherein content, which has a relationship index changed to be less than the specific value, is prevented from being output to the sub-screen, when the relationship index is consecutively adjusted down to be less than the specific value.

8. The method of claim 7, further comprising:
adjusting up a relationship index of content when the content is added by the input of the user.

9. The method of claim 8, wherein:
a sub-screen is additionally disposed by further splitting a specific region of the main screen, when the relationship index is consecutively adjusted up such that the relationship index is the specific value or more; and
content having the relationship index changed to the specific value or more is disposed to the additionally disposed sub-screen.

10. The method of claim 7, wherein disposing the at least one sub-screen is canceled when the main screen and the at least one sub-screen output the same content.

11. The method of claim 7, wherein the content having the relationship index of the specific value or more is output to the at least one sub-screen, when the main screen and the at least one sub-screen output the same content.

12. The method of claim 7, further comprising:
learning positions in which the main screen and the at least one sub-screen are disposed.

* * * * *